United States Patent
Shimura et al.

(10) Patent No.: US 7,114,795 B2
(45) Date of Patent: Oct. 3, 2006

(54) DATA PROCESSING APPARATUS, DATA PROCESSING METHOD, PROGRAM, AND INK JET PRINTING SYSTEM

(75) Inventors: Norio Shimura, Kanagawa (JP); Masaya Kikuta, Kanagawa (JP); Tetsushi Kohno, Tokyo (JP); Takeaki Nakano, Tokyo (JP); Hirokazu Kameda, Kanagawa (JP); Masaaki Endo, Tokyo (JP); Shigeki Abe, Tokyo (JP); Manabu Kuchiki, Kanagawa (JP); Masanori Echigo, Kanagawa (JP); Munetaka Yamaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 10/647,204

(22) Filed: Aug. 26, 2003

(65) Prior Publication Data
US 2004/0046809 A1    Mar. 11, 2004

(30) Foreign Application Priority Data
Aug. 27, 2002   (JP) ............................... 2002-247691

(51) Int. Cl.
*B41J 2/165* (2006.01)
(52) U.S. Cl. ..................... 347/36; 347/89; 347/90
(58) Field of Classification Search ............ 347/22, 347/31–32, 36, 89–90
See application file for complete search history.

(56) References Cited

U.S. PATENT DOCUMENTS

| 6,357,854 B1* | 3/2002 | Igval et al. ................. 347/36 |
| 6,502,916 B1 | 1/2003 | Naka |
| 6,709,088 B1* | 3/2004 | Hayakawa et al. .......... 347/31 |

FOREIGN PATENT DOCUMENTS

| JP | 11-99727 | 4/1999 |
| JP | 2000-71581 | 3/2000 |
| JP | 2000-103087 | 4/2000 |
| JP | 2000-185411 | 7/2000 |
| JP | 2002-86760 | 3/2002 |

* cited by examiner

*Primary Examiner*—Thinh Nguyen
(74) *Attorney, Agent, or Firm*—Fitzpatrick, Cella, Harper & Scinto

(57) ABSTRACT

An ink jet printing system is provided which has an ink jet printing apparatus and a host and which alleviates a data processing load on the ink jet printing apparatus, prevents a reduction in a printing operation speed, and realizes a cost reduction. The ink jet printing apparatus of this invention has an ink receiving member for receiving waste ink ejected onto an overrunning area outside edges of a print medium and an accumulated value memory section for storing an accumulated value equivalent to waste ink volumes ejected onto the ink receiving member. The host includes a waste ink volume setting section for obtaining a value equivalent to a waste ink volume and a data sending section for sending data to the ink jet printing apparatus. The accumulated value memory section of the ink jet printing apparatus stores the accumulated value equivalent to waste ink volumes obtained by the host.

8 Claims, 7 Drawing Sheets

DATA PROCESSING APPARATUS, DATA PROCESSING METHOD, PROGRAM, AND INK JET PRINTING SYSTEM

This application claims priority from Japanese Patent Application No. 2002-247691 filed Aug. 27, 2002, which is incorporated hereinto by reference.

BACKGROUND OF THE INVENTION

1. Field of the Invention

The present invention relates to a method, an apparatus, a program to process data to be sent to a printing apparatus capable of executing a marginless printing that leaves no blank margins at edges of a print medium, and a printing system including the data processing apparatus and the printing apparatus.

2. Description of the Related Art

Among modes in which an ink jet printing apparatus prints on a print medium, a so-called marginless printing is known, which forms an image on an entire surface of the print medium without leaving any blank margins at peripheries of the print medium. With this marginless printing, a printing operation is performed until there is no blank margin left at at least one of top, bottom, left and right edges of the print medium. To ensure that peripheral parts of the print medium are printed reliably, the printing apparatus ejects ink not only over a print area inside the edges of the print medium but also over an area extending a few millimeters outwardly beyond the edges. Ink that is applied to the outside of the print medium lands on an ink absorbing member on a platen (platen absorbent) and is absorbed in it.

In this printing apparatus, until the amount of ink accumulated in the platen absorbent exceeds a predetermined volume, a problem of contaminated print medium and apparatus scarcely occurs. But once a total volume of accumulated waste ink exceeds an absorption limit of the platen absorbent, the ink oozes out from this absorbent, staining a back of the print medium or, in some cases, adhering to an interior of an ink jet printing apparatus. To deal with this problem, this kind of ink jet printing apparatus cumulatively adds up the volume of waste ink applied to the platen absorbent and, when the sum reaches the absorption limit of the platen absorbent, displays an error prompting a replacement of the platen absorber.

The management of the waste ink volume and the error annunciation described above may be carried out as follows. (A) The printing apparatus may perform the steps of (1) analyzing print data received from a host to calculate the waste ink volume applied during the marginless printing, (2) cumulatively adding a value representing the calculated waste ink volume to a value representing a total volume of waste ink accumulated in the platen absorbent up to that point in time (platen waste ink volume) and (3) when the cumulative value exceeds a predetermined value (e.g., absorption limit), issuing an alarm signal, such as an annunciation that "ink may ooze out of a platen absorbent." (B) The host may perform the step of (4) displaying an error based on the alarm signal received from the printing apparatus.

With the method described above, however, since the printing apparatus must perform data processing, such as analyzing the print data sent from the host to calculate the waste ink volume applied during the marginless printing and cumulatively adding the calculated waste ink volume, the processing load of the printing apparatus increases, complicating the control. Another problem is that the load of this additional data processing affects other processing (e.g., indexing the received print data), reducing the processing speed of the apparatus as a whole and therefore the printing operation speed. Further, to store a program for executing the data processing described above requires installing a memory of large capacity (ROM) on the printing apparatus side, and such a large-capacity memory is costly. In addition, for the above data processing to be executed, a high-performance calculation means (CPU) is required. Such a high-performance calculation means is also costly. Such processing therefore results in a cost increase.

SUMMARY OF THE INVENTION

The present invention has been accomplished to overcome the aforementioned problems experienced with the conventional techniques and provides a data processing method, a data processing apparatus and a printing system including the data processing apparatus and a printing apparatus, which enable a marginless printing with no ink overflow related problem, without providing a large-capacity memory or a high-performance calculation means in the printing apparatus or without reducing a printing speed as practically as possible.

To achieve the above objective, the present invention has the following construction.

Viewed from one aspect, the present invention provides a data processing method for processing data to be supplied to an ink jet printing apparatus, wherein the ink jet printing apparatus can perform a marginless printing that forms an image on a print medium up to the very edges of the print medium by, according to print data, ejecting ink onto an area inside the edges of the print medium and onto an overrunning area outside the edges, the data processing method comprising: a waste ink volume determining step to determine a value equivalent to a waste ink volume associated with the marginless printing; and a data sending step to send to the ink jet printing apparatus data representing the value equivalent to a waste ink volume determined by the waste ink volume determining step.

In a second aspect, the present invention provides a data processing apparatus for supplying data to an ink jet printing apparatus, wherein the ink jet printing apparatus can perform a marginless printing that forms an image on a print medium up to the very edges of the print medium by, according to print data, ejecting ink onto an area inside the edges of the print medium and onto an overrunning area outside the edges, the data processing apparatus comprising: a waste ink volume determining means to determine a value equivalent to a waste ink volume associated with the marginless printing; and a data sending means to send to the ink jet printing apparatus data representing the value equivalent to a waste ink volume determined by the waste ink volume determining means.

In a third aspect, the present invention provides a program for controlling an ink jet printing apparatus, wherein the ink jet printing apparatus can perform a marginless printing that forms an image on a print medium up to the very edges of the print medium by, according to print data, ejecting ink over a range from an area inside the edges of the print medium to an overrunning area outside the edges, the program causing a computer to execute a waste ink volume determining step to determine a value equivalent to a waste ink volume associated with the marginless printing; and a data sending step to send to the ink jet printing apparatus data representing the value equivalent to a waste ink volume determined by the waste ink volume determining step.

In a fourth aspect, the present invention provides an ink jet printing system having an ink jet printing apparatus and a host for supplying print data to the ink jet printing apparatus, wherein the ink jet printing apparatus can perform a marginless printing that forms an image on a print medium up to the very edges of the print medium by, according to print data, ejecting ink over a range from an area inside the edges of the print medium to an overrunning area outside the edges, (A) the host comprising: a waste ink volume determining means for determining a value equivalent to a waste ink volume associated with the marginless printing; and a data sending means for sending to the ink jet printing apparatus data representing the value equivalent to a waste ink volume determined by the waste ink volume determining means; (B) the ink jet printing apparatus comprising: an ink receiving member for receiving waste ink ejected onto the overrunning area outside the edges of the print medium during the marginless printing; and an accumulated value memory means for cumulatively adding up data representing the values equivalent to waste ink volumes sent from the host and storing an accumulated value equivalent to waste ink volumes ejected onto the ink receiving member during the marginless printing.

With this invention of the above construction, complex data processing such as determining a value equivalent to a waste ink volume is performed by the host, so that the ink jet printing apparatus needs only to perform very simple processing such as adding up or storing data processed by the host (data representing a waste ink volume). This eliminates the need for a high-performance calculation/storing means and a large-capacity memory, and enables the system to be constructed at a reduced cost. This arrangement also enables a high-speed printing even during a marginless printing.

Further, since, with this invention, the processing to determine a value equivalent to a waste ink volume associated with each marginless printing is performed by the host and the value equivalent to a waste ink volume determined by the host is sent to the ink jet printing apparatus which then stores the received value, the processing load on the ink jet printing apparatus can be reduced significantly. Further, this configuration obviates the need for installing a large-capacity memory and a high-performance calculation means and thus can reduce the cost. Further, since the host executes the waste ink volume determining processing while at the same time performing image processing, the ink jet printing apparatus can omit the processing of reanalyzing print data, simplifying the control system of the printing apparatus as a whole.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Now, one embodiment of the present invention will be described by referring to the accompanying drawings.

Figure 1:
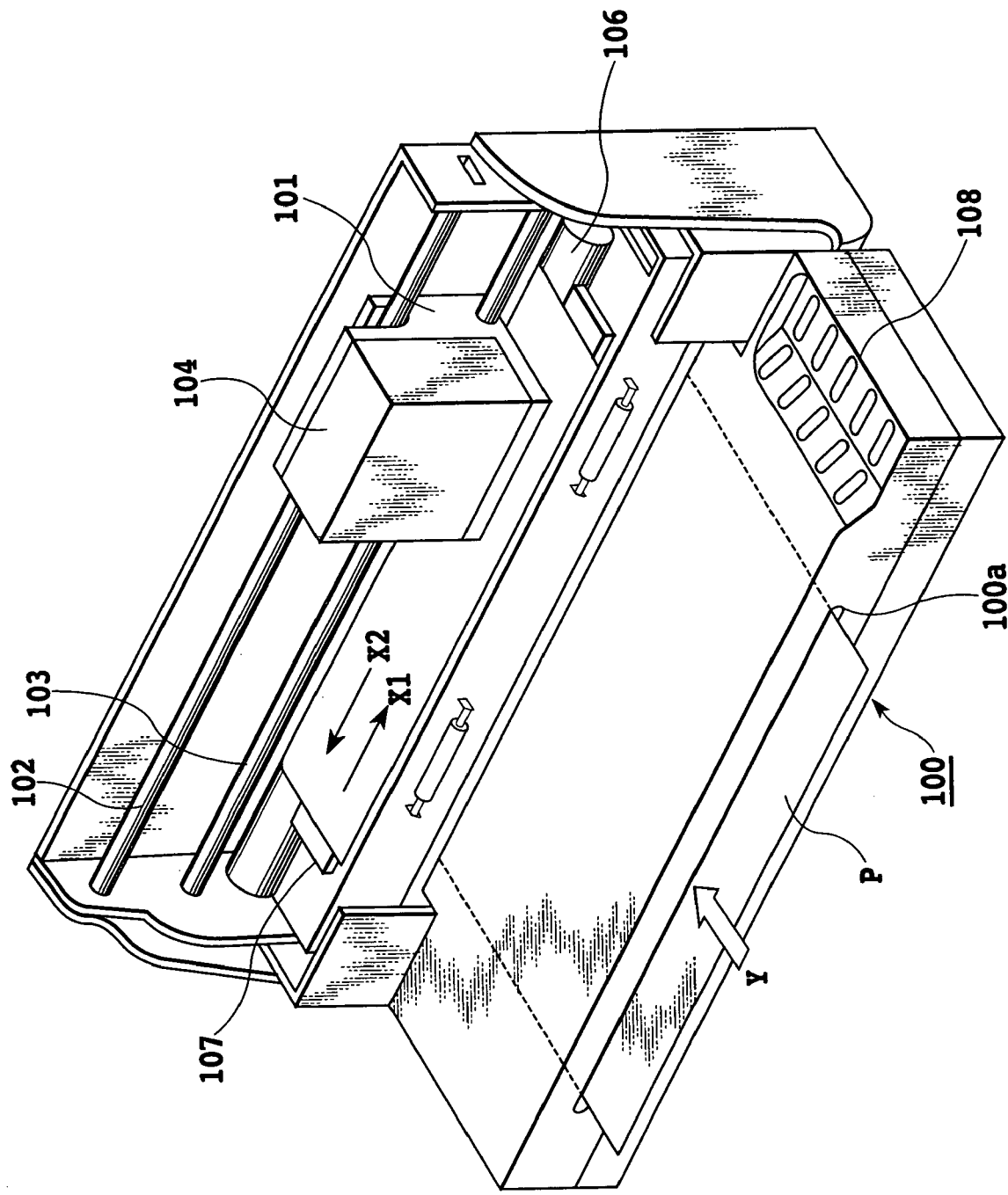
FIG. 1 is a perspective view showing an outline configuration of an ink jet printing apparatus applied to one embodiment of the present invention.

FIG. 1 is a perspective view showing an outline construction of an ink jet printing apparatus that can apply the present invention. In the figure, a print medium P inserted into a paper feed port 100a of the printing apparatus 100 is fed in a direction of arrow Y by a feed roller 106 to a printing area where it is printed by a head cartridge 104. In the printing area there is a flat platelike platen 107 on which the print medium P is supported in a horizontal, planar state. The platen 107 has a platen absorbent (ink receiving member), which receives and absorbs ink applied outside the print medium P. The platen absorbent of this embodiment is made so that if waste ink ejected onto the platen absorbent is less than its maximum ink absorption volume (absorption limit), the waste ink will not adhere to the back of the print medium P as it slides over the platen. The platen absorbent has a width in excess of a maximum width of the print medium P as measured in the main scan direction, wide enough to tolerate insertion errors and transport errors of the print medium P.

A carriage 101 is axially movable along two guide shafts 102, 103 and driven by a carriage motor (not shown) to reciprocally scan in the main scan direction (indicated by arrows X1, X2). After each main scan by the carriage 101, the print medium P is fed a predetermined distance (equivalent to a print width of a print head 104) in a subscan direction (indicated by arrow Y) for the next main scan operation. These main scan and subscan operations are repeated until one page printing is completed.

The head cartridge 104 mounted on the carriage 101 has a print head with an array of ink ejection nozzles arranged at a predetermined density and an ink tank to supply ink to the print head. A face of the print head formed with nozzle openings opposes the print medium P transported onto the platen 107. Denoted 108 is an operation unit having switches and indicators, with switches used to turn on or off power of the ink jet printing apparatus 100 and set a variety of printing modes and with the indicators displaying a state of the ink jet printing apparatus 100 in the event of errors.

Figure 2:
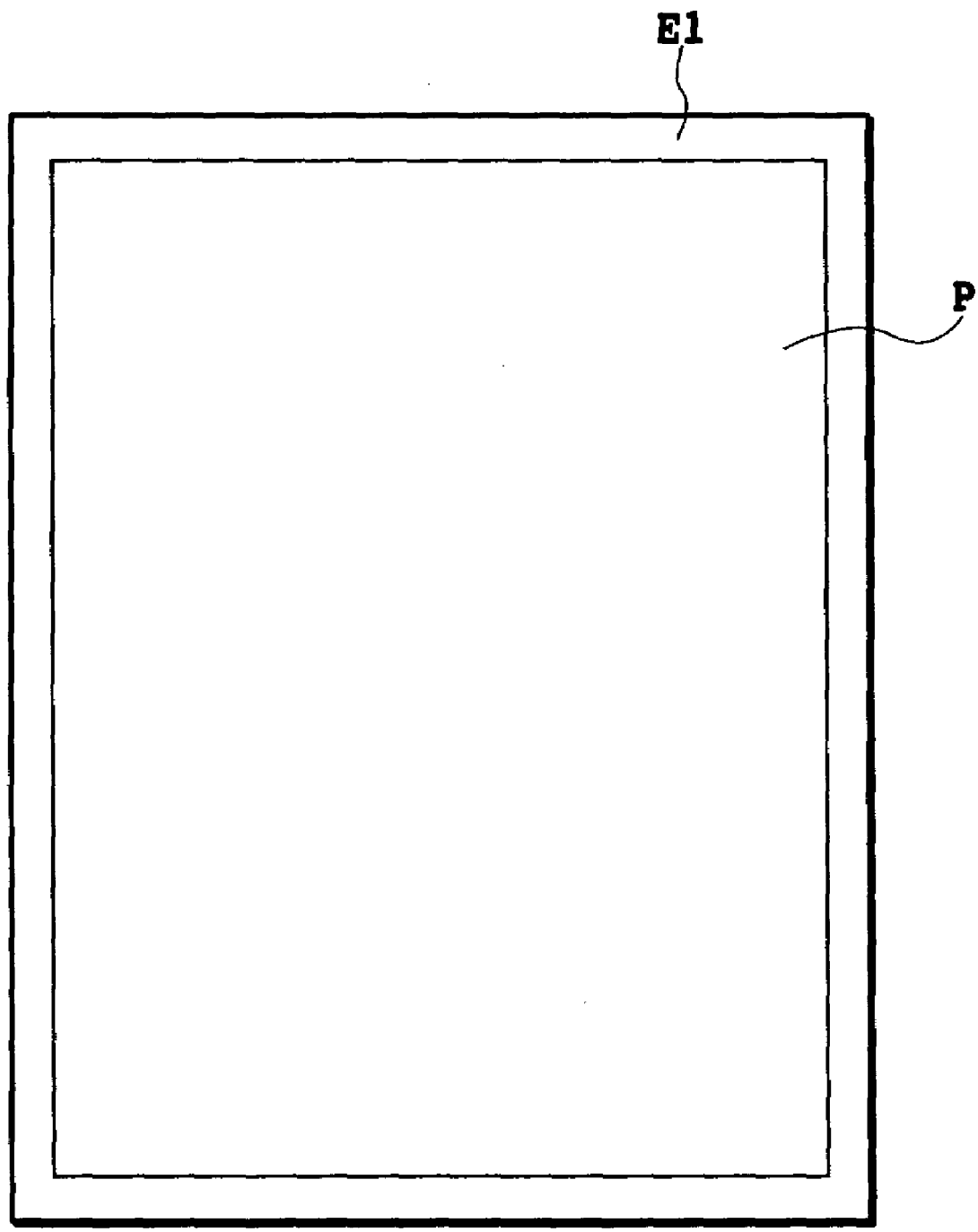
FIG. 2 is a schematic diagram showing an area outside a print medium to which ink is applied during a marginless printing in one embodiment of the invention.

FIG. 2 schematically shows an area E1 overrunning the print medium P where ink is also applied. As shown in the figure, the ink jet printing apparatus 100 ejects ink dots (waste ink dots) not only inside but also outside the top and bottom edges and left and right edges of the print medium P during the marginless printing. In this embodiment, the volume of waste ink applied to the overrunning area E1 (hereafter referred to as a platen waste ink volume) is determined by a printer driver described later.

Figure 3:
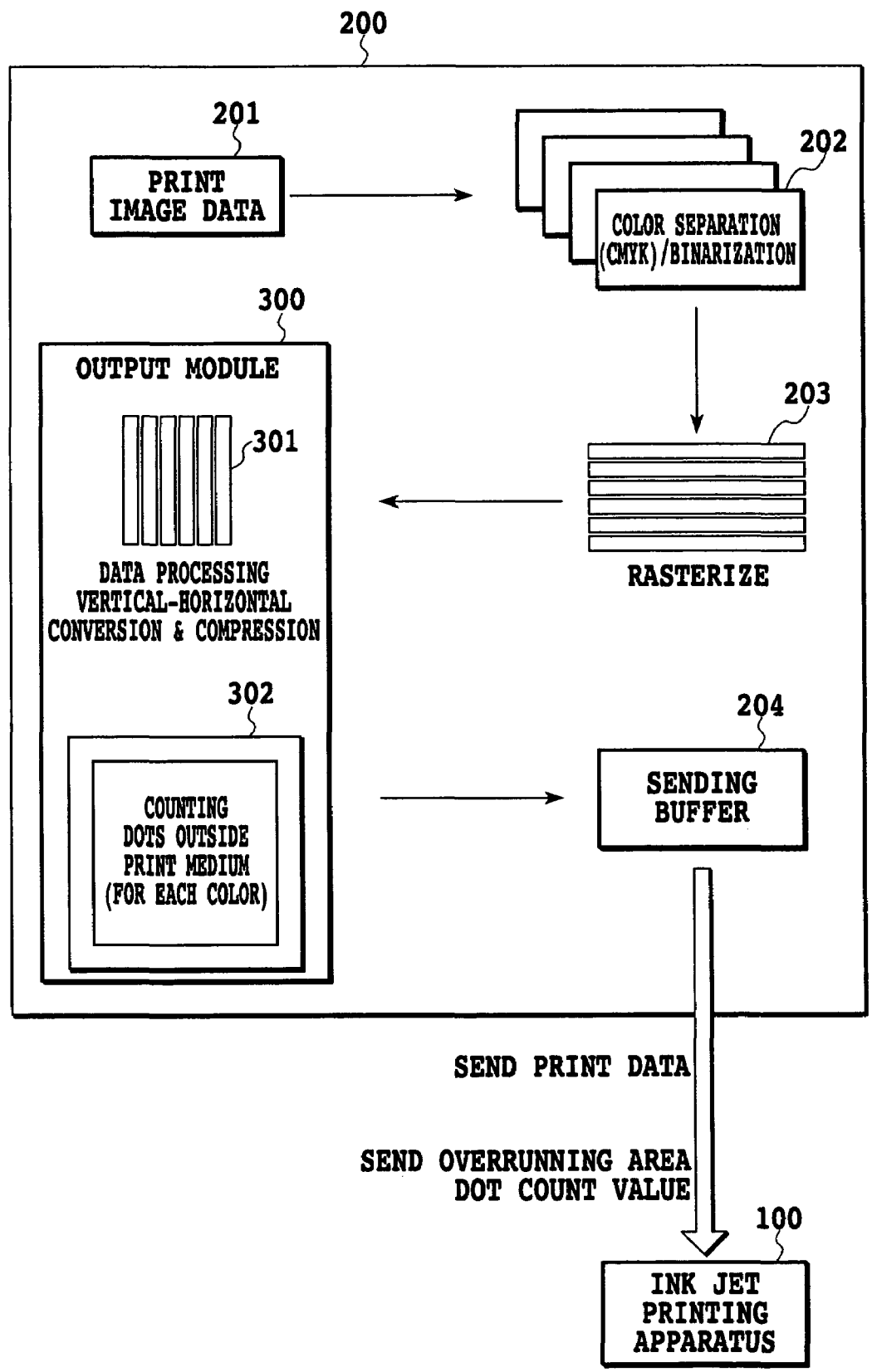
FIG. 3 is an explanatory diagram conceptually showing a sequence of processing performed by a printer driver on a host in one embodiment of the invention.

FIG. 3 conceptually illustrates a procedure of operation performed by a printer driver used in a host 200 connected to the ink jet printing apparatus of FIG. 1.

In a normal printing, when the user specifies printing, the host 200 performs separation processing (202) to separate image data 201 into print data of four colors (cyan (C), magenta (M), yellow (Y), black (K)) (in the case of color print data) or black (K) print data (in the case of monochromatic print data). Next, rasterize processing (203) is executed to separate print data of each color into 1-raster data. Then, the rasterized data is sent to an output module 300 where it is subjected to vertical-horizontal conversion and data compression (301). The vertical-horizontal conversion means processing to convert a data arrangement from raster data (horizontally arranged data) into column data (vertically arranged data).

When raster data for one scan is accumulated in the output module 300, a printing apparatus operation command is attached to the raster data which is then transferred to a sending buffer 204. The sending buffer 204, after a predetermined volume of data is accumulated, sends it to the ink jet printing apparatus 100.

When the user specifies a marginless printing, the printer driver in the host 200 checks if there is any print data that causes ink to be ejected onto the overrunning area E1 outside the print medium P. If such print data exists, a waste ink volume determination means 302 in the output module 300 counts the number of ink dots for each color that are ejected outside the print medium P. After the printing operation for one page is finished, the dot count value for one page is sent from the output module 300 to the sending buffer (sending means) 204, from which it is further transmitted to the ink jet printing apparatus 100.

Figure 4:
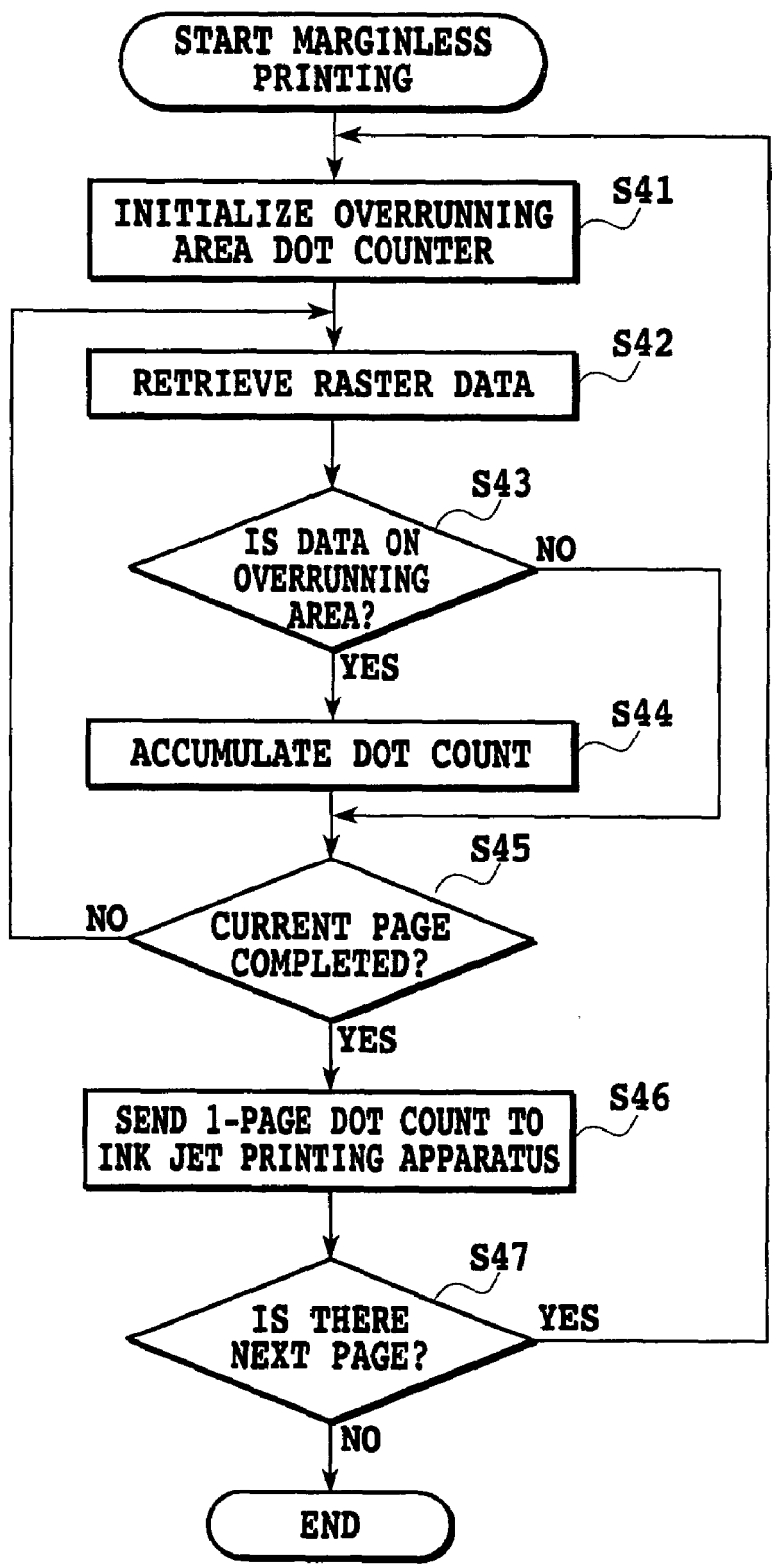
FIG. 4 is a flow chart showing a control operation performed by the host to count ink dots ejected outside the print medium in one embodiment of the invention.

Now, the processing of counting the number of ink dots to be ejected outside the print medium, as performed by the output module 300 when the marginless printing is specified, will be explained by referring to the flow chart of FIG. 4.

First, at the head of the print data of one page, a dot counter for counting the number of ink dots to be ejected outside the print medium P is initialized (cleared to zero) (step S41). Next, raster data is retrieved (step S42) and a check is made to see if the data retrieved is the one for ink dots to be ejected outside the print medium (step S43). If it is decided that the retrieved raster data is outside the print medium P, the number of dot data is counted and added to a cumulative count value (step S44).

After this, it is checked whether the count operation described above has been done for one page of print data. If it is decided that the count operation is finished for one page (step S45), the data for that page representing the count value of ink dots to be ejected outside the print medium P (waste ink dot number) is transmitted to the ink jet printing apparatus (step S46). If there is a next page to be printed (step S47), the processing is repeated beginning with step S41.

Figure 5:
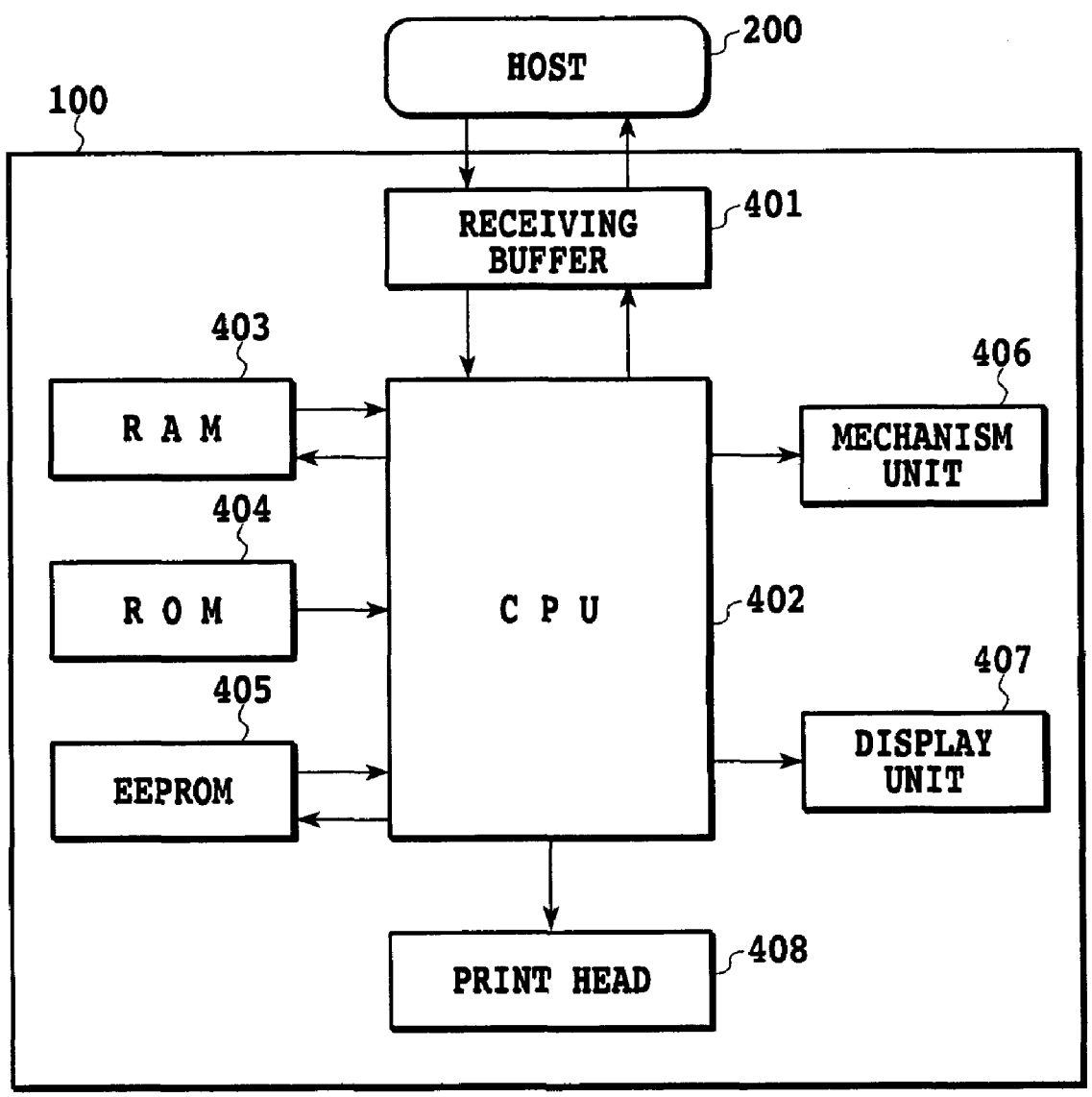
FIG. 5 is a block diagram schematically showing a control system of an ink jet printing apparatus in one embodiment of the invention.

Now, an outline configuration of a main portion of the control system of the ink jet printing apparatus 100 as applied to this embodiment of the invention will be explained by referring to a block diagram of FIG. 5. The control system of the ink jet printing apparatus 100 receives from the host 200 character and image data to be printed and temporarily stores it in a receiving buffer 401. Data representing an operation state of the printing apparatus 100 that was output from a CPU 402 is also transferred through the receiving buffer 401 to the host 200.

The data from the host 200 accumulated in the receiving buffer 401 is processed under the control of the CPU 402 to produce data that can be printed by the print head as it performs the main scan, and the processed data is stored in a random access memory (RAM) 403. The data in the RAM 403 is transferred by a print head control unit to a print head 408 which, according to the received data, drives an ejection energy generation means such as electrothermal transducers in the head to eject ink droplets, thus forming characters and images. A mechanism unit 406 controls the operations of a carriage motor and a line feed motor (not shown). A display unit 407 comprises display panels, such as LEDs and liquid crystal display elements driven by commands from the CPU 402, and a control unit for controlling them.

The host 200, as described above, sends not only the print data for causing ink dots to be ejected onto the print medium but also the count value of ink dots to be ejected outside the print medium (waste ink dot number). The data representing the waste ink dot number is stored in the receiving buffer 401. When this waste ink dot number data is received from the host 200, the CPU 402 retrieves from a programmable nonvolatile memory (accumulated value memory means) 405 such as EEPROM an accumulated number of ink dots ejected onto the overrunning area E1 outside the print medium P, adds up the accumulated value and the dot count number stored in the receiving buffer 401, and stores the latest accumulated value of the platen waste ink volume in the EEPROM 405.

A control operation performed by the ink jet printing apparatus when it receives data representing the waste ink dot number from the host 200 will be explained by referring to a flow chart of FIG. 6.

First, when the receiving buffer 401 receives data representing the waste ink dot number (step S61), a check is made to see if the value is zero (step S62). Next, if the value is not determined to be zero, the platen waste ink volume to be ejected onto the platen absorbent is determined based on the waste ink dot number (step S63). Then, the accumulated platen waste ink volume up to the previous marginless printing operation is read from the EEPROM 405 (step S64), and the platen waste ink volume to be ejected by the current marginless printing operation is added to the accumulated platen waste ink volume (step S65). Then, the newly obtained accumulated platen waste ink volume is stored in (written into) the EEPROM 405 (step S66). While the flow chart of FIG. 6 manages the waste ink volume by using the waste ink volume itself, it may of course be managed by using the number of ink dots. In that case, the waste ink volume does not have to be calculated from the data representing the waste ink dot number, and the dot number information is stored in the EEPROM 405.

Figure 6:
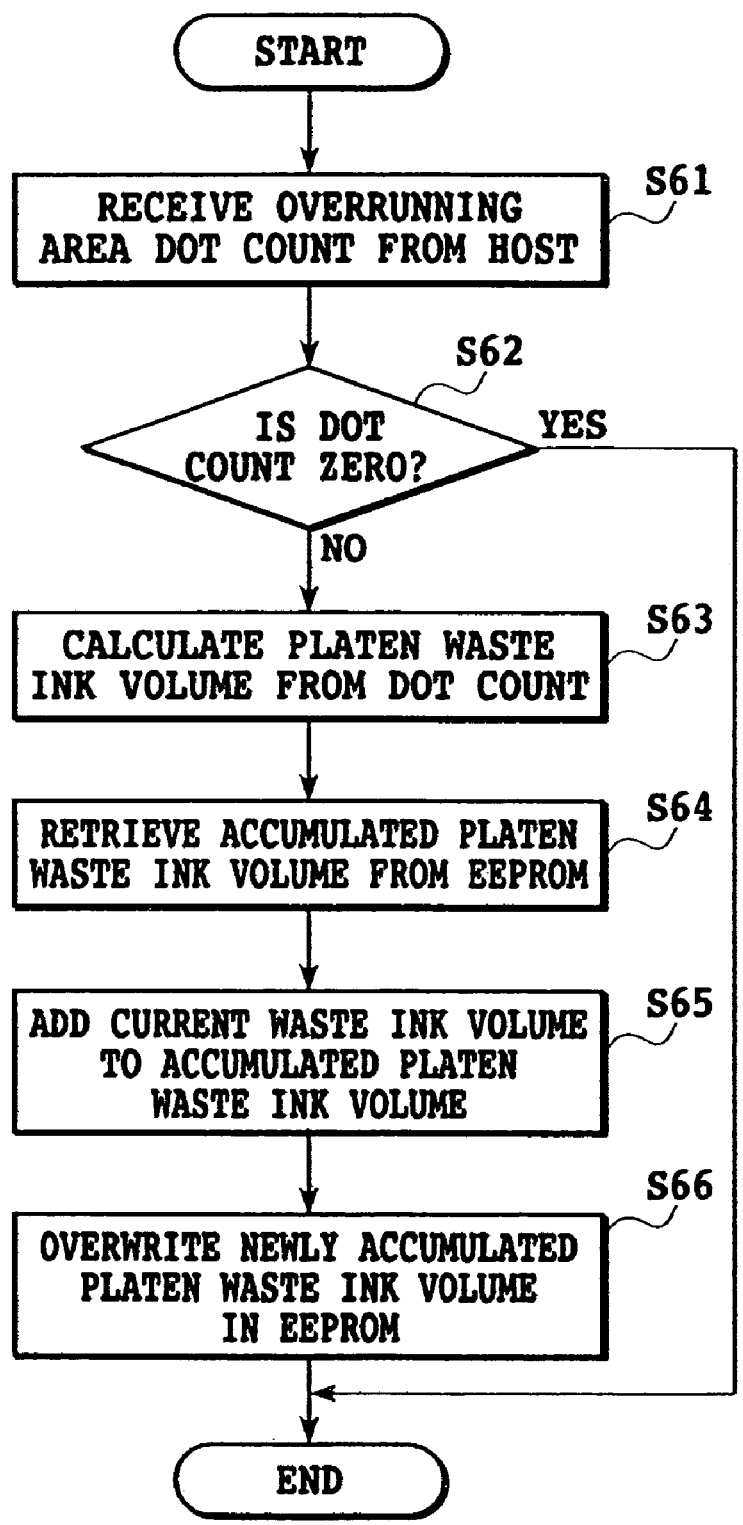
FIG. 6 is a flow chart showing a control operation to set a platen waste ink volume in the ink jet printing apparatus in one embodiment of the invention.
Figure 7:
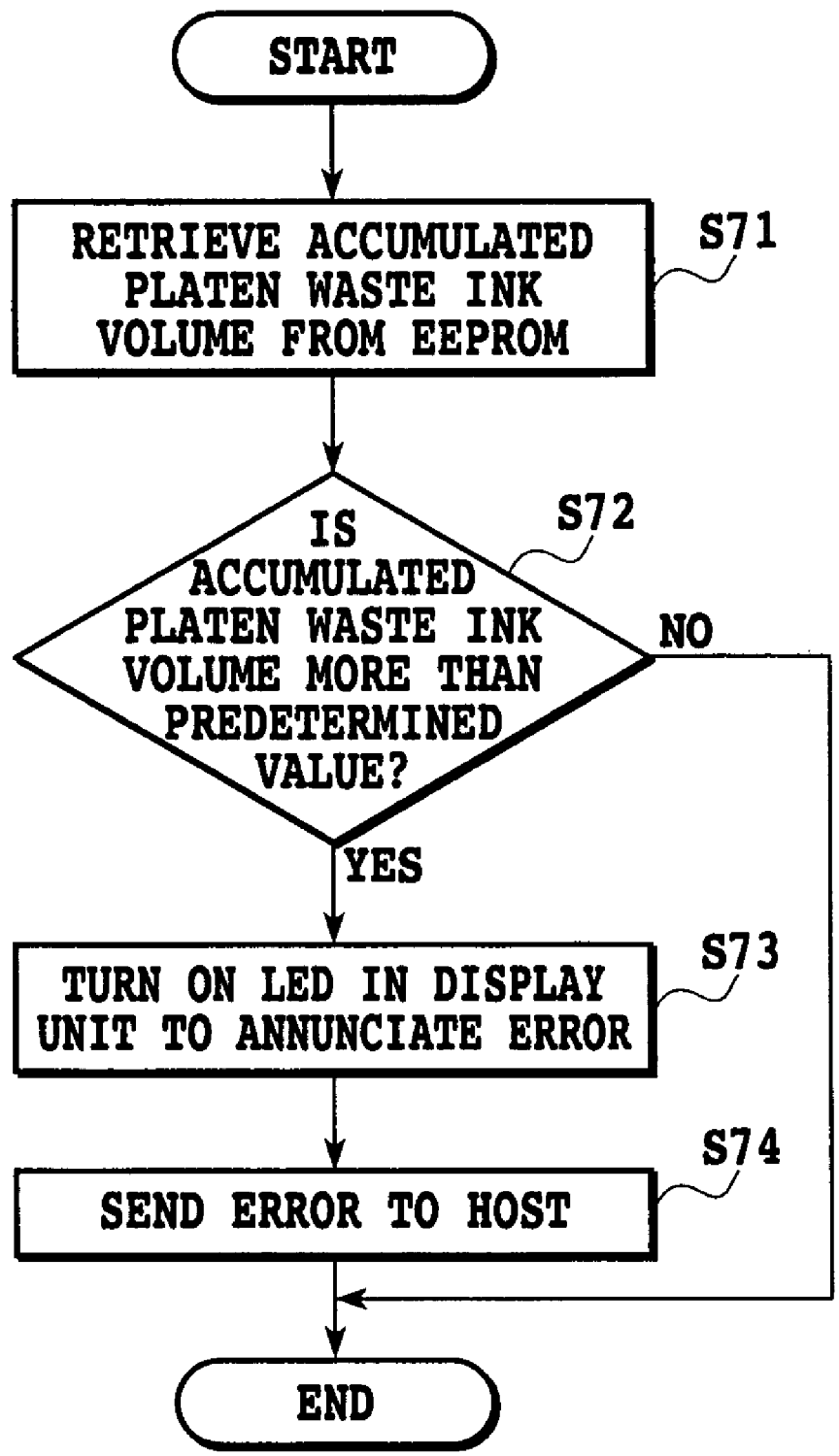
FIG. 7 is a flow chart showing a control operation executed according to an accumulated volume of platen waste ink in one embodiment of the invention.

FIG. 7 is a flow chart showing a control operation executed by step S66 of FIG. 6 according to the "accumulated platen waste ink volume" stored in the EEPROM 405.

Each time step S66 of FIG. 6 stores the new accumulated platen waste ink volume in the EEPROM 405, the CPU 402 checks whether the stored accumulated platen waste ink volume has reached (or exceeded) a predetermined value (step S71, S72). Here, the predetermined value is a maximum ink absorption volume (absorption limit) of the platen absorbent or a slightly smaller value. When the accumulated platen waste ink volume is found to have reached (or exceeded) the predetermined value, an indication element (such as LED) of the display unit 407 is turned on, indicating that the waste ink has reached (or exceeded) the maximum ink absorption volume of the platen absorbent or is about to reach it. At the same time, warning data is sent to the host 200 (S74). Upon receiving this warning data, the host 200 displays an error dialog on a screen, alerting the user to the fact that the platen absorbent is full of waste ink or nearly full. In this error state, it may be an effective step to disable the operation of the ink jet printing apparatus.

The check on the accumulated platen waste ink volume may be performed when the power of the ink jet printing apparatus is turned on or after a printed medium is discharged.

With the above embodiment, in the process of marginless printing, complex processing such as extracting data of platen waste ink dots from print data and determining the number of the waste ink dots is carried out by the host 200 and the ink jet printing apparatus 100 need only sum up the platen waste ink dot numbers sent from the host 200. This simplifies the control executed on the part of the ink jet printing apparatus 100 to a large extent and obviates the need for a large-capacity memory (e.g., ROM) and a high-performance calculation device (e.g., CPU), resulting in a cost reduction. This arrangement also reduces the processing time taken by the ink jet printing apparatus, preventing a possible reduction in the printing speed of the ink jet printing apparatus.

Further, in the above embodiment, since a warning is issued to the user when the ink volume absorbed in the platen absorbent reaches a predetermined value, it is possible to prevent a print medium from being stained on its back as it passes over the platen absorbent that no longer can absorb ink or to prevent an interior of the ink jet printing apparatus from being contaminated by ink from the platen absorbent.

Further, in the above embodiment, in determining on the part of the host the waste ink volume applied during the marginless printing, since the number of ink dots ejected onto the overrunning area outside a print medium is counted, it is possible to obtain highly precise information on the waste ink volume in units of dots.

While in the above embodiment the information on the waste ink volume is obtained by the dot counting and then transmitted to the printing apparatus, the present invention is not limited to this configuration. For example, a value representing a predetermined waste ink volume that matches a print medium size may be selected and sent to the printing apparatus.

That is, the processing of counting dots ejected onto the overrunning area is not performed but a particular value corresponding to the print medium size is determined to be a "value equivalent to the waste ink volume". Since the dot counting is not executed, the precise number of ink dots to be ejected onto the overrunning area outside the print medium is not known and therefore this configuration is not as good as the above embodiment in terms of accurately managing the waste ink volume. It has, however, an advantage of simplified processing because the dot counting is not performed. In this configuration, different values are used as the waste ink volume for different sizes of print media, while the same value is used for print media of the same size without regard to a print duty.

As can be seen from the above, it is important for the host to obtain a value equivalent to the waste ink volume applied during the marginless printing. The method of obtaining this value is not limited to the dot counting.

In the above embodiment, although whether or not the accumulated waste ink volume has reached a predetermined value is checked on the ink jet printing apparatus side, this check can be done on the host side. This can alleviate the burden on the ink jet printing apparatus. It is noted, however, that in this case too, at least an accumulated value memory means (e.g., ROM) to store a latest accumulated value of the waste ink volume is required, and that when the power of the ink jet printing apparatus is turned on, the accumulated value read from the accumulated value memory means needs to be transmitted to the host. The host then adds up the accumulated value sent from the ink jet printing apparatus and the number of waste ink dots extracted from the print data and sends the sum as a latest accumulated value to the ink jet printing apparatus where it is stored in (written into) the accumulated value memory means.

Further, ink jet printing apparatus commonly perform a preliminary ink ejection operation and a recovery operation by suction to discharge bubbles and viscous ink from a print head. Waste ink ejected or sucked out from the print head during this recovery operation is accommodated in an ink absorbent. In the above embodiment, a situation is contemplated in which the waste ink absorbent to absorb ink discharged during the recovery operation is separately provided in addition to the platen absorbent (waste ink receiver). Therefore, a warning is issued based on only the waste ink volume applied during the marginless printing. In some ink jet printing apparatus, however, the waste ink absorbent for the recovery operation and the platen absorbent are formed integral or connected together. In that case, the ink absorbing state of the waste ink absorbent needs to be detected by also considering the waste ink volume from the recovery operation.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A data processing method for processing data to be supplied to an ink jet printing apparatus, wherein the ink jet printing apparatus can perform a marginless printing for printing without providing margin on an edge of the print medium by ejecting ink onto an area inside the edge of the print medium and onto an overrunning area outside the edge based on recording data, the data processing method comprising steps of:

obtaining a value equivalent to a waste ink volume associated with the marginless printing; and sending data representing the obtained value to the ink jet printing apparatus, wherein the value is obtained by counting a number of ink ejections to the overrunning area based on the recording data.

2. A data processing method according to claim 1, wherein the value is obtained for every page of the print medium or for every predetermined print area, and the data representing the obtained value is sent successively to the ink jet printing apparatus.

3. A data processing method according to claim 1, wherein the value equivalent to the waste ink volume associated with the marginless printing is obtained by accumulating the values obtained for respective predetermined print areas, and the data representing the accumulated value is sent to the ink jet printing apparatus.

4. A data processing apparatus for supplying data to an ink jet printing apparatus, wherein the ink jet printing apparatus can perform a marginless printing for printing without providing margin on an edge of the print medium by ejecting ink onto an area inside the edge of the print medium and onto an overrunning area outside the edge based on recording data, the data processing apparatus comprising:

obtaining means for obtaining a value equivalent to a waste ink volume associated with the marginless printing; and data sending means for sending data representing the value obtained by said obtaining means to the ink jet printing apparatus, wherein said obtaining means obtains the value by counting a number of ink droplets to be ejected onto the overrunning area based on the recording data.

5. A program for controlling an ink jet printing apparatus, wherein the ink jet printing apparatus can perform a marginless printing for printing without providing margin on an edge of the print medium by ejecting ink onto an area inside the edge of the print medium and onto an overrunning area outside the edge based on recording data, the program causing a computer to execute steps of:

obtaining a value equivalent to a waste ink volume associated with the marginless printing; and sending data representing the obtained value to the ink jet printing apparatus, wherein the value is obtained by counting a number of ink ejections to the overrunning area based on the recording data.

6. An ink jet printing system having an ink jet printing apparatus and a host for supplying print data to the ink jet printing apparatus, wherein the ink jet printing apparatus can perform a marginless printing for printing without providing margin on an edge of the print medium by ejecting ink onto an area inside the edge of the print medium and onto an overrunning area outside the edge based on recording data, the host comprising:

waste ink volume obtaining means for obtaining a value equivalent to a waste ink volume associated with the marginless printing, the value being obtained by counting a number of ink droplets to be ejected onto the overrunning area based on the recording data; and data sending means for sending data representing the value obtained by said waste ink volume obtaining means to the ink jet printing apparatus;

the ink jet printing apparatus comprising:

an ink receiving member for receiving waste ink ejected onto the overrunning area during the marginless printing; and an accumulated value memory means for cumulatively adding up the value of data sent from the host and storing an accumulated value equivalent to waste ink volumes ejected onto the ink receiving member.

7. An ink jet printing system according to claim 6, wherein the ink jet printing apparatus further comprises:

decision means for checking whether the accumulated value stored in said accumulated value memory means has exceeded a predetermined value; and sending means for sending warning data to the host when the accumulated value exceeds the predetermined value; and wherein the host further comprises:

error display means for, according to the warning data sent from the ink jet printing apparatus, displaying on a screen an indication that the ink jet printing apparatus is in an error state.

8. An ink jet printing system according to claim 7, wherein, in the error state in which the accumulated value exceeds the predetermined value, at least one of the ink jet printing apparatus and the host performs at least one of displaying of the error and disabling of the operation of the ink jet printing apparatus.

* * * * *